US012782907B2

(12) United States Patent
Oonishi

(10) Patent No.: US 12,782,907 B2
(45) Date of Patent: Nov. 3, 2026

(54) NUMERICAL CONTROL DEVICE

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 413 days.

(21) Appl. No.: 18/553,179

(22) PCT Filed: Apr. 13, 2021

(86) PCT No.: PCT/JP2021/015271
§ 371 (c)(1),
(2) Date: Sep. 28, 2023

(87) PCT Pub. No.: WO2022/219701
PCT Pub. Date: Oct. 20, 2022

(65) Prior Publication Data

US 2024/0184265 A1 Jun. 6, 2024

(51) Int. Cl.
*G05B 19/404* (2006.01)
*G05B 19/401* (2006.01)
*G05B 19/402* (2006.01)

(52) U.S. Cl.
CPC ......... *G05B 19/404* (2013.01); *G05B 19/401* (2013.01); *G05B 19/402* (2013.01)

(58) Field of Classification Search
CPC .. G05B 19/402; G05B 19/401; G05B 19/404; G05B 2219/49206; G05B 2219/49219
See application file for complete search history.

(56) References Cited

U.S. PATENT DOCUMENTS 6,060,854 A 5/2000 Yutkowitz
9,753,449 B2 * 9/2017 Sato .................. G05B 19/4063
(Continued)

FOREIGN PATENT DOCUMENTS

CN 107077119 A 8/2017
JP H11-237920 A 8/1999
(Continued)

OTHER PUBLICATIONS

International Search Report issued in PCT/JP2021/015271; mailed Jun. 22, 2021.

*Primary Examiner* — Mong-Shune Chung
(74) *Attorney, Agent, or Firm* — Studebaker Brackett PLLC

(57) ABSTRACT

Provided is a numerical control device capable of reducing a cycle time by performing positioning while performing a positioning error elimination operation more appropriately. A numerical control device 1 provided with: a final positioning command determination unit 14 which, when block analysis is performed on a positioning command block including a positioning error elimination operation, reads ahead the machining program and thereby determines the final positioning command that should complete the positioning by finally eliminating the positioning error; a post-positioning movement direction determination unit 15 which determines the direction of movement indicated by the command following the final positioning command; and a positioning error elimination operation determination unit 16 which, on the basis of the results of the determination by the final positioning command determination unit 14 and the post-positioning movement direction determination unit 15, determines the axis on which a positioning error elimination operation should be performed, and determines an operation for eliminating the positioning error on the determined axis
(Continued)

on which a positioning error elimination operation should be performed.

5 Claims, 4 Drawing Sheets

(56) References Cited

U.S. PATENT DOCUMENTS

| | | | | |
|---|---|---|---|---|
| 10,481,580 | B2 * | 11/2019 | Nagaoka | G05B 19/4062 |
| 2014/0039666 | A1 | 2/2014 | Kim | |
| 2014/0222186 | A1 * | 8/2014 | Wada | B25J 9/1641 700/114 |
| 2015/0331409 | A1 * | 11/2015 | Oka | G05B 19/4155 700/114 |
| 2017/0108847 | A1 * | 4/2017 | Ito | G05B 19/29 |
| 2019/0361421 | A1 * | 11/2019 | Tsuda | G05B 13/027 |

FOREIGN PATENT DOCUMENTS

| | | | | |
|---|---|---|---|---|
| JP | 2009-282829 | A | 12/2009 | |
| JP | 2015-210563 | A | 11/2015 | |
| JP | 2016-038701 | A | 3/2016 | |
| JP | 2020-015130 | A | 1/2020 | |
| WO | WO-2017221380 | A1 * | 12/2017 | G05B 19/404 |
| WO | 2018/066048 | A1 | 4/2018 | |

* cited by examiner

NUMERICAL CONTROL DEVICE

TECHNICAL FIELD

The present disclosure relates to a numerical control device.

BACKGROUND ART

Conventionally, a numerical control device has been proposed that can shorten a cycle time by performing positioning at an optimum timing (for example, see Patent Documents 1 and 2).

By the way, a function is known that performs finally single direction positioning in order to eliminate a reverse direction positioning error due to, for example, backlash of a ball screw and perform positioning with accuracy. In the single direction positioning, positioning is performed only from one direction set in advance. For example, in a case of movement in a direction opposite to the set one direction, the positioning is performed in a manner of passing an end point once and moving reversely toward the end point.

Patent Document 1: Japanese Unexamined Patent Application, Publication No. 2015-210563

Patent Document 2: Japanese Unexamined Patent Application, Publication No. 2009-282829

DISCLOSURE OF THE INVENTION

Problems to be Solved by the Invention

However, there are many cases in which the single direction positioning operation is unnecessary in the actual machining operation. In this case, when the single direction positioning operation is set as a modal command, the single direction positioning operation is performed even though the single direction positioning is unnecessary, which causes a cycle time to become longer.

Further, conventionally, sufficient consideration has not been given to a start timing of single direction positioning, and a cycle time may be lengthened depending on the start timing.

Therefore, a technique is required capable of shortening the cycle time by performing a positioning error elimination operation such as single direction positioning more appropriately.

It is an object of the present disclosure to provide a numerical control device capable of shortening the cycle time by performing positioning while performing a positioning error elimination operation more appropriately.

Means for Solving the Problems

An aspect of the present disclosure provides a numerical control device that machines a workpiece by driving an axis of a machine tool based on a machining program, the numerical control device including: a final positioning command determination unit that determines a final positioning command that finally eliminates a positioning error and complete positioning by reading ahead the machining program when a positioning command block with a positioning error elimination operation is analyzed; a post-positioning movement direction determination unit that determines a movement direction according to a command after the final positioning command; and a positioning error elimination operation determination unit that determines, based on results of determination by the final positioning command determination unit and the post-positioning movement direction determination unit, an axis on which a positioning error elimination operation is performed, and determines an operation to eliminate a positioning error on a determined axis on which the positioning error elimination operation is performed.

Another aspect of the present disclosure provides a numerical control device that machines a workpiece by driving an axis of a machine tool based on a machining program, the numerical control device including: a final positioning command determination unit that determines a final positioning command that finally eliminates a positioning error and complete positioning by reading ahead the machining program when a positioning command block with a positioning error elimination operation is analyzed; and a positioning error elimination operation determination unit that determines, based on a result of determination by the final positioning command determination unit, a timing at which a positioning error elimination operation is able to be started, and determines an operation to eliminate a positioning error after a determined timing.

Effects of the Invention

According to the present disclosure, it is possible to provide a numerical control device capable of shortening a cycle time by performing positioning while performing a positioning error elimination operation more appropriately.

PREFERRED MODE FOR CARRYING OUT THE INVENTION

An embodiment of the present disclosure will be described in detail below with reference to the drawings.

A numerical control device 1 according to the present embodiment machines a workpiece by driving an axis of a machine tool based on a machining program. Further, the numerical control device 1 according to the present embodiment has a positioning function with a positioning error elimination operation of eliminating a reverse direction positioning error due to, for example, backlash of a ball screw and performing positioning with accuracy. Thus, the numerical control device 1 according to the present embodiment is a numerical control device capable of shortening a cycle time by performing positioning while performing a minimum required positioning error elimination operation.

Figure 1:
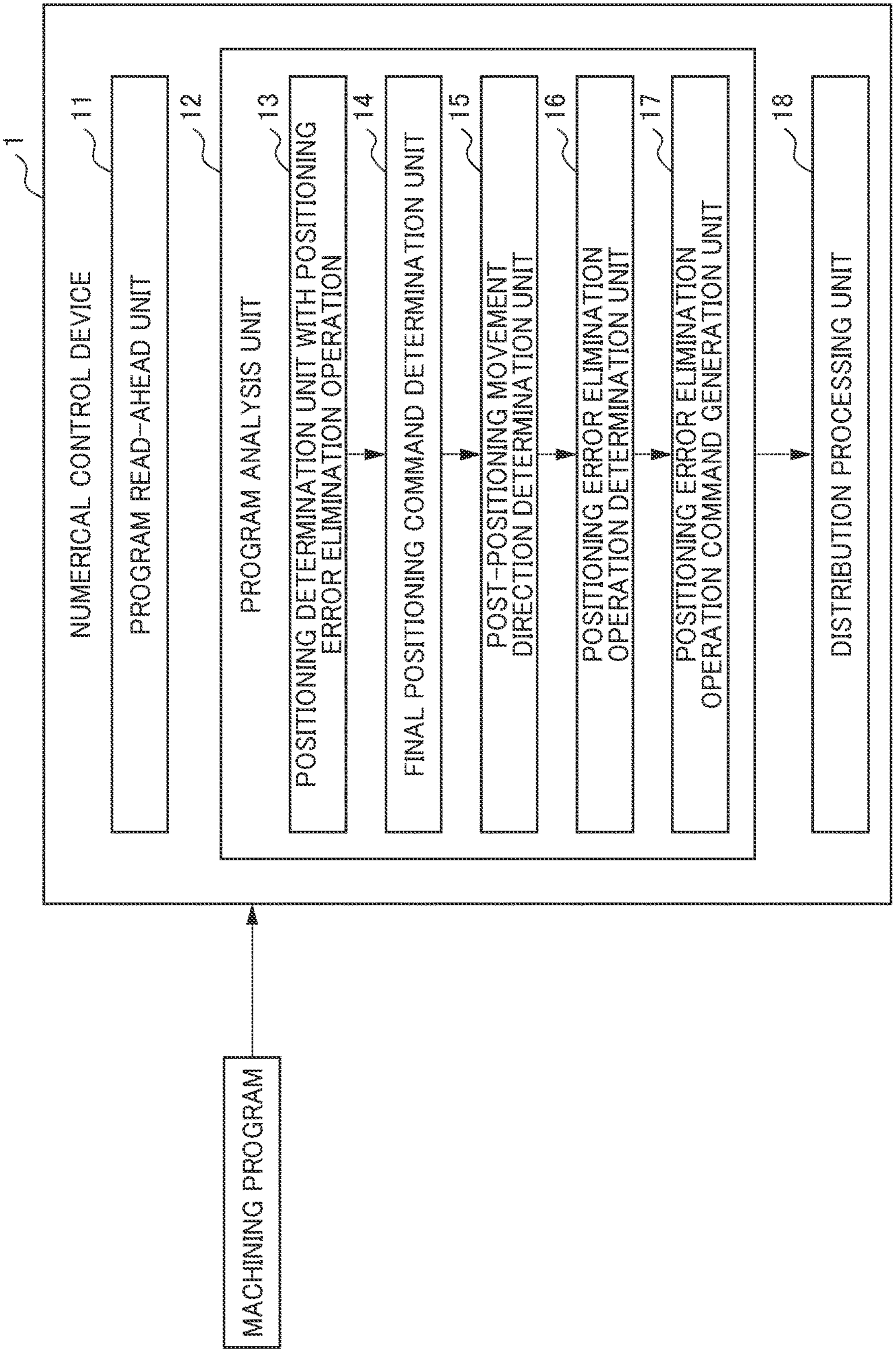
FIG. 1 is a block diagram showing a configuration of a numerical control device according to an embodiment of the present disclosure.

FIG. 1 is a block diagram showing a configuration of a numerical control device 1 according to an embodiment of the present disclosure. The numerical control device 1 according to the present embodiment has a hardware configuration including a CPU, a ROM, a RAM, a nonvolatile memory, a bus, an axis control circuit, a servo amplifier, and an interface, all of which are not shown. A servomotor and an input/output device, which are not shown, are connected to the numerical control device 1 according to the present embodiment.

As shown in FIG. 1, the numerical control device 1 according to the present embodiment includes a program read-ahead unit 11, a program analysis unit 12, and a distribution processing unit 18.

In addition, the program analysis unit 12 of the present embodiment includes a positioning determination unit with positioning error elimination operation 13, a final positioning command determination unit 14, a post-positioning movement direction determination unit 15, a positioning error elimination operation determination unit 16, and a positioning error elimination operation command generation unit 17.

Prior to actual machining by executing a machining program, the program read-ahead unit 11 reads ahead the machining program for each block. The machining program read ahead is analyzed by the program analysis unit 12, which will be described below, and a machining path of the workpiece is analyzed.

When the program analysis unit 12 reads one block at a time, the program read-ahead unit 11 of the present embodiment starts read-ahead of the machining program when the positioning determination unit with positioning error elimination operation 13 to be described below determines that the block is a positioning block with a positioning error elimination operation. Further, the program read-ahead unit 11 of the present embodiment ends the read-ahead of the machining program after a positioning error elimination operation command is generated by the positioning error elimination operation command generation unit 17 which will be described below.

When the program analysis unit 12 reads one block at a time, the positioning determination unit with positioning error elimination operation 13 determines whether the block is a positioning block with a positioning error elimination operation. Specifically, the positioning determination unit with positioning error elimination operation 13 determines whether the block is a single direction positioning operation command block defined by a G code (G60).

When the program analysis unit 12 analyzes a positioning command block with a positioning error elimination operation, the program read-ahead unit 11 described above reads ahead the machining program, and thus the final positioning command determination unit 14 determines a final positioning command that should finally eliminate the positioning error and complete the positioning. Specifically, when positioning blocks are continuous, the final positioning command determination unit 14 determines that a final positioning command block of the continuous positioning blocks as a final positioning command that should finally eliminate the positioning error and complete the positioning.

The post-positioning movement direction determination unit 15 determines a movement direction according to a command after the final positioning command determined by the final positioning command determination unit 14 described above. Specifically, the post-positioning movement direction determination unit 15 determines a movement direction in a machining operation command such as a linear interpolation operation command after the final positioning command.

The positioning error elimination operation determination unit 16 determines an axis, on which the positioning error elimination operation should be performed, based on the results of the determination by the final positioning command determination unit 14 and the post-positioning movement direction determination unit 15 described above. Specifically, the positioning error elimination operation determination unit 16 determines, based on the final positioning command that should finally eliminate the positioning error and complete the positioning among the continuous positioning blocks and the movement direction in the command after the final positioning command, the axis on which the positioning error elimination operation should be performed.

For example, the positioning error elimination operation determination unit 16 may determine an axis that has finished moving in the axial direction, as an axis on which the positioning error elimination operation should be performed. More specifically, the positioning error elimination operation determination unit 16 may determine an axis that is not in a subsequent movement direction and that has been moved by the positioning operation so far and has finished moving in the axial direction, as an axis on which the positioning error elimination operation should be performed.

Further, the positioning error elimination operation determination unit 16 determines an operation so as to eliminate the positioning error on the determined axis on which the positioning error elimination operation should be performed. Specifically, for the positioning error elimination operation such as a single direction positioning operation defined by G60, various parameters of as an operation target axis or direction and a back-off distance are set, and the positioning error elimination operation determination unit 16 determines an operation to eliminate the positioning error based on setting of these parameters, for example.

The positioning error elimination operation determination unit 16 may determine a start timing of the positioning error elimination operation on the axis on which the positioning error elimination operation should be performed, and determine an operation to eliminate the positioning error on the axis on which the positioning error elimination operation should be performed after the determined timing. Thus, it is possible to execute the positioning error elimination operation at optimum timing.

Specifically, the positioning error elimination operation determination unit 16 starts the positioning error elimination operation such that the positioning error elimination operation ends before the end of the command after the final positioning command. Alternatively, the positioning error elimination operation determination unit 16 may start the positioning error elimination operation on the axis on which the positioning error elimination operation should be performed at the same time as a movement start of the next positioning block in the continuous positioning blocks.

The positioning error elimination operation command generation unit 17 generates a positioning error elimination operation command, based on the positioning error elimination operation determined by the positioning error elimination operation determination unit 16 described above. The generated positioning error elimination operation command is output to the distribution processing unit 18 which will be described below.

The distribution processing unit 18 generates an interpolation movement command based on the machining program command. In addition, the distribution processing unit 18 generates a distribution command to distribute the generated interpolation movement command and the positioning error elimination operation command generated by the positioning error elimination operation command generation unit 17 described above to each driving axis. The generated distribution command is output by a movement command output unit (not shown).

Next, a positioning function with a positioning error elimination operation of the numerical control device 1 according to the present embodiment will be described in detail.

The numerical control device 1 according to the present embodiment has a positioning function with a positioning error elimination operation of eliminating a reverse direction positioning error due to, for example, backlash of a ball screw and performing positioning with accuracy. An example of a positioning operation with a positioning error elimination operation may include a single direction positioning operation in which positioning is finally performed from one direction.

In the single direction positioning operation, the positioning operation is performed only from one direction set in advance. For example, in a case of movement in a direction opposite to the set one direction, the positioning is performed in a manner of passing an end point once and moving reversely toward the end point.

The single direction positioning operation is defined by a G code (G60) in the machining program. The single direction positioning operation is selected as one-shot or modal by setting of parameters. In addition, an axis for single direction positioning, a direction for single direction positioning, and a magnitude of a back-off distance (overrun stroke) at the time of reversal are set in advance by parameters.

Figure 2:
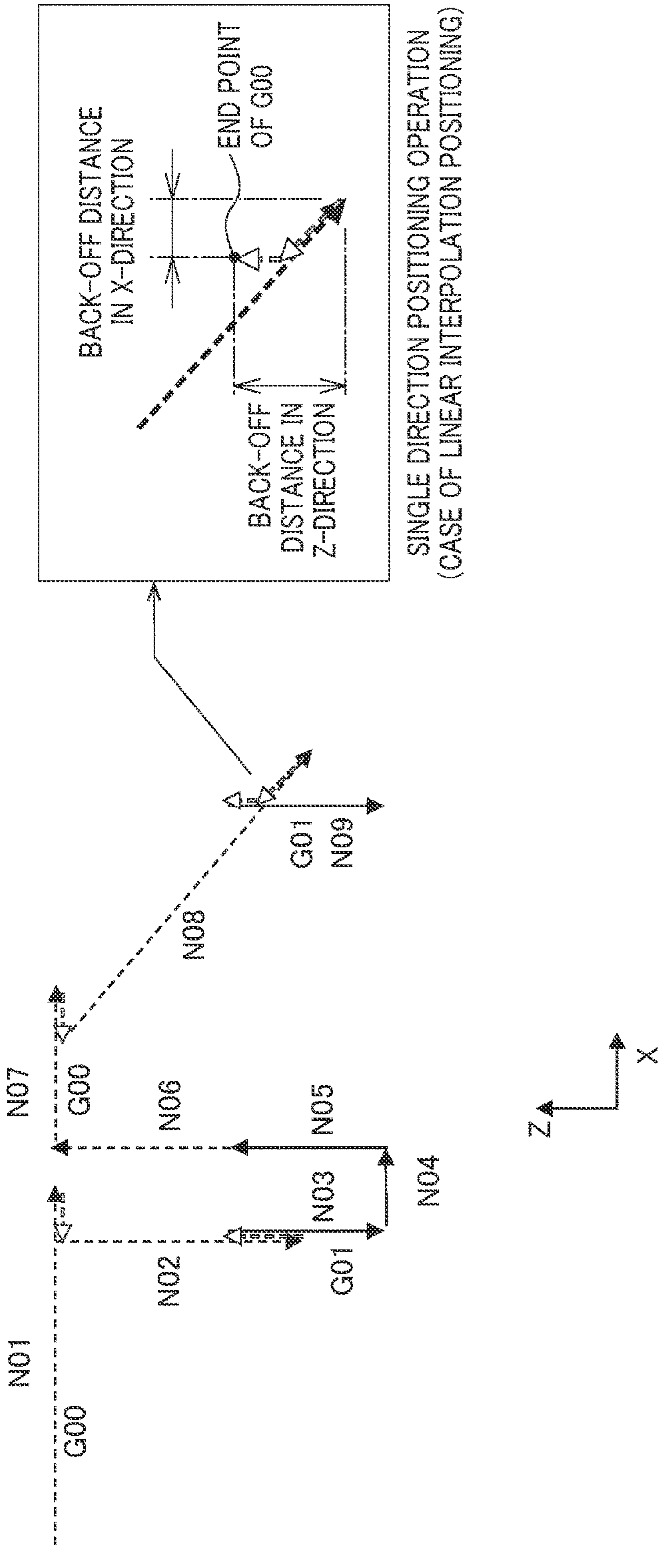
FIG. 2 is a diagram showing an example of a command path of a conventional numerical control program.

Here, FIG. 2 is a diagram showing an example of a command path of a conventional numerical control program. FIG. 2 shows a command path on an XZ plane. In FIG. 2, blocks with sequence numbers N01, N02, N06, N07, and N08 indicated by dashed arrows represent positioning (fast-feed) operations, and are defined by G code (G00). In FIG. 2, blocks with sequence numbers N03, N04, N05, and N09 indicated by solid arrows represent linear interpolation operations for machining a workpiece, and are defined by G code (G01).

In the example shown in FIG. 2, the single direction positioning operation is parameterized to perform positioning in a direction from right to left in FIG. 2 with respect to the X-axis. Further, in the example shown in FIG. 2, the single direction positioning operation is parameterized to perform positioning in a direction from bottom to top in FIG. 2 with respect to the Z-axis. Therefore, for example, at the end of the block N08 enlarged in FIG. 2, the positioning is performed at an end point of G00 in a manner of being pulled back in the Z-axis direction by a back-off distance parameterized in advance in the Z-axis direction after being pulled back in the X-axis direction by a back-off distance parameterized in advance in the X-axis direction.

However, as described above, there are many cases in which the single direction positioning operation is unnecessary in the actual machining operation. In this case, when the single direction positioning operation is set as a modal command, the single direction positioning operation is performed even though the single direction positioning operation is unnecessary, which causes a cycle time to become longer.

Specifically, at a positioning operation end position of G00, that is, an end point of G00 that does not affect the positioning at a start position of the next linear interpolation operation of G01, there is no need to execute the single direction positioning operation. In the example shown in FIG. 2, the end of a block N07 corresponds thereto. In other words, as shown in FIG. 2, although a single direction positioning operation is executed with respect to an X-axis at the end of the block N07, the end of the block N07 further moves in the X-axis direction in the next block N08 and does not affect the positioning at a start position of a block N09, which is a start position of a linear interpolation operation of a subsequent G01, whereby it can be seen that there is no need to execute the single direction positioning operation with respect to the X-axis at the end of the block N07.

Further, after the positioning operation end of G00, there is no need to execute the single direction positioning operation with respect to the axis that moves in the next block. In the example shown in FIG. 2, the end of a block N02 and the end of a block N08 correspond thereto. In other words, as shown in FIG. 2, since a Z-axis is an axis that moves in a block N03, which is a block next to the block N02, there is no need to execute the single direction positioning operation with respect to the Z-axis at the end of the block N02. Similarly, since the Z-axis is an axis that moves in the block N09, which is a block next to the block N08, there is no need to execute the single direction positioning operation with respect to the Z-axis at the end of the block NOB.

In addition, there is necessarily no need to execute the single direction positioning operation at the end of each block in the positioning operation of G00. In the example shown in FIG. 2, the end of the block N01 corresponds thereto. In other words, as shown in FIG. 2, although the single direction positioning operation is executed with respect to the X-axis at the end of the block N01, the X-axis positioning operation may be executed while the next block, that is, the block N02 is moving in the Z-axis direction (the direction from top to bottom in FIG. 2), from the viewpoint of shortening the cycle time, and the reason is because it is not necessarily need to start the movement of N02 after the completion of the single direction positioning operation at the end of the block N01.

As described above, since the single direction positioning operation is often unnecessary in the actual machining operation, it is desirable to issue a single direction positioning command only for blocks that require the minimum single direction positioning operation. However, even when the single direction positioning command is issued only for blocks that require the minimum single direction positioning operation, there is still room for improvement in terms of shortening the cycle time as described above. In addition, it is not easy and troublesome to create a program considering locations where the single direction positioning operations are required.

In contrast, the numerical control device 1 according to the present embodiment automatically determines the axis on which the positioning error elimination operation such as the single direction positioning operation should be performed. In addition, the numerical control device 1 according to the present embodiment automatically determines the timing to start the positioning error elimination operation on the axis on which the positioning error elimination operation should be performed. Thus, according to the present embodiment, the minimum required single direction positioning can be executed at the optimum timing.

Figure 3:
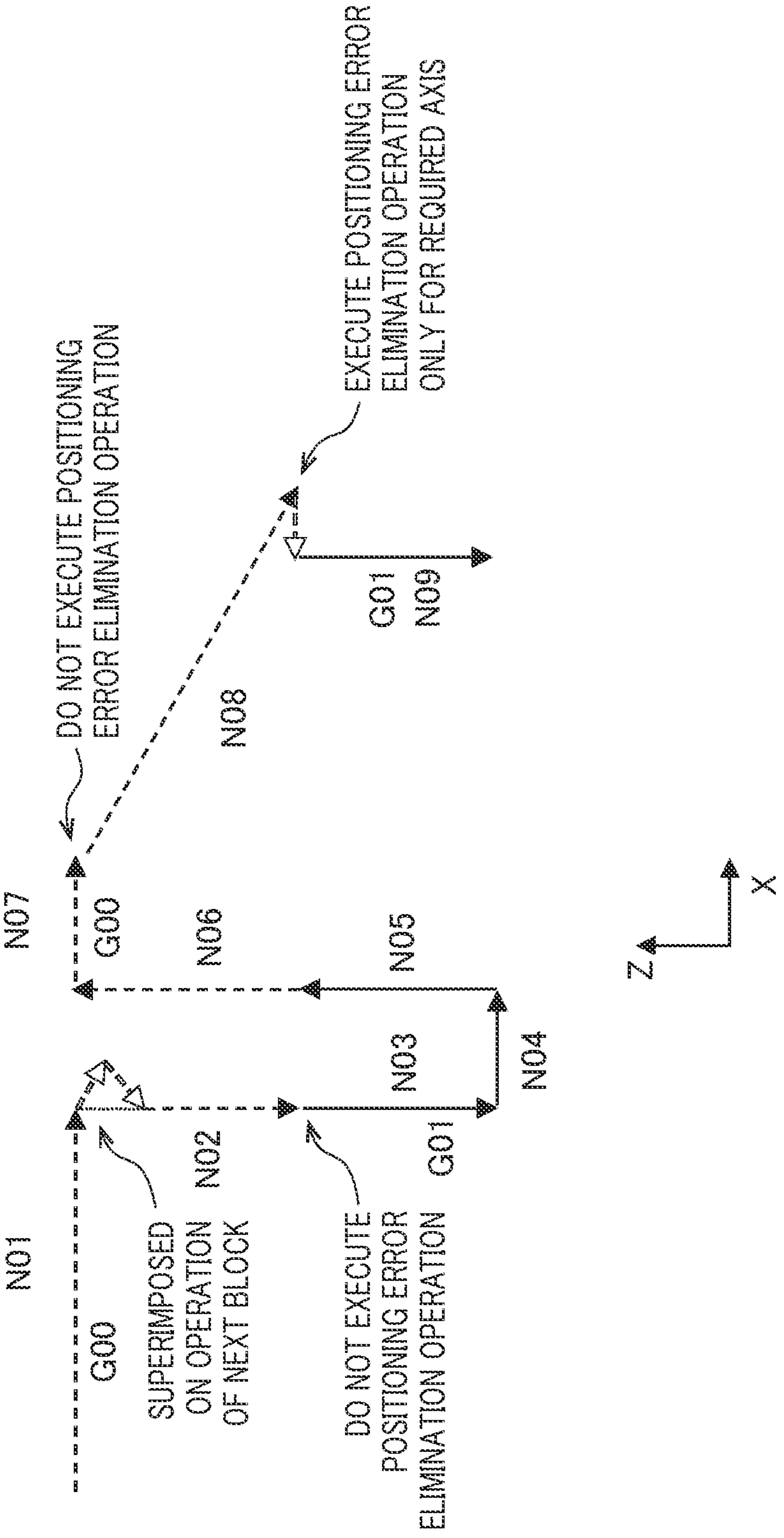
FIG. 3 is a diagram showing an example of a command path of the numerical control program according to the embodiment of the present disclosure.

Here, FIG. 3 is a diagram showing an example of a command path of the numerical control program according to the present embodiment. As in FIG. 2, FIG. 3 shows a command path on an XZ plane. In FIG. 3, blocks with sequence numbers N01, N02, N06, N07, and N08 indicated by dashed arrows represent positioning (fast-feed) operations, and are defined by G code (G00). Similarly, in FIG. 3, blocks with sequence numbers N03, N04, N05, and N09 indicated by solid arrows represent linear interpolation operations for machining, and are defined by G code (G01). The command path of each block shown in FIG. 3 is the same as the command path in FIG. 2 except for the positioning error elimination operation command.

As described above with reference to FIG. 2, the X-axis is the only axis that requires the single direction positioning operation after the block N01 ends. This is because the X-axis operation in the positioning block ends in the block N01 and the Z-axis operation is executed in the next block N02. However, it is not always necessary to execute the single direction positioning operation at the end of the block N01 as described above. On the other hand, in the numerical control device 1 according to the present embodiment, after the operation of the block N01 is completed, it is determined that the single direction positioning operation can be executed with respect to the X-axis. After the determination, a positioning error elimination operation command is generated, and the generated positioning error elimination operation command is superimposed on the operation command of the block N02. Thus, as indicated by the dashed arrows in FIG. 3, the X-axis positioning operation is not executed at the end of the block N01 as in the conventional operation, but the X-axis positioning operation is executed while the block N02 is moving in the Z-axis direction (the direction from top to bottom in FIG. 3). In other words, since the block moves in the Z-axis direction (the direction from top to bottom in FIG. 3) while the X-axis positioning operation is performed, the cycle time is shortened as compared with the conventional operation.

As described above with reference to FIG. 2, the operation is movement in the Z-axis direction in the block N03 which is G01 after the final positioning, and the positioning operations up to that point involve movement of the X-axis and the Z-axis, whereby no single direction positioning operation with respect to the Z-axis is necessary at the end of the block N02. On the other hand, in the numerical control device 1 according to the present embodiment, after the operation of the block N02 is completed, the single direction positioning operation is not determined to be necessary and the single direction positioning operation is not executed, whereby the cycle time is shortened as compared with the conventional operation.

As described above with reference to FIG. 2, the end of the block N07 moves further in the X-axis direction and the Z-axis direction in the next block N08 and does not affect the positioning at a start position of the block N09, which is a start position of a linear interpolation operation of a subsequent G01, whereby there is no need to execute the single direction positioning operation at the end of the block N07. On the other hand, in the numerical control device 1 according to the present embodiment, after the operation of the block N07 is completed, it is not determined that the single direction positioning operation is executable, and the single direction positioning operation is not executed, whereby the cycle time is shortened as compared with the conventional operation.

As described above with reference to FIG. 2, at the end of the block N08, the X-axis is the only axis that requires the single direction positioning operation. This is because the X-axis operation in the positioning block ends in the block N08 and the Z-axis moves in the block N09 that is the next block. On the other hand, in the numerical control device 1 according to the present embodiment, after the operation of the block N08 is completed, it is determined that the single direction positioning operation can be executed with respect to the X-axis. After the determination, a positioning error elimination operation command is generated, and according to the generated positioning error elimination operation command, the positioning error elimination operation is executed after the operation of the block N08 is completed as indicated by the dashed arrow in FIG. 3. Thus, the minimum required single direction positioning operation can be executed with respect to the X-axis, whereby the cycle time is shortened as compared with the conventional operation.

Figure 4:
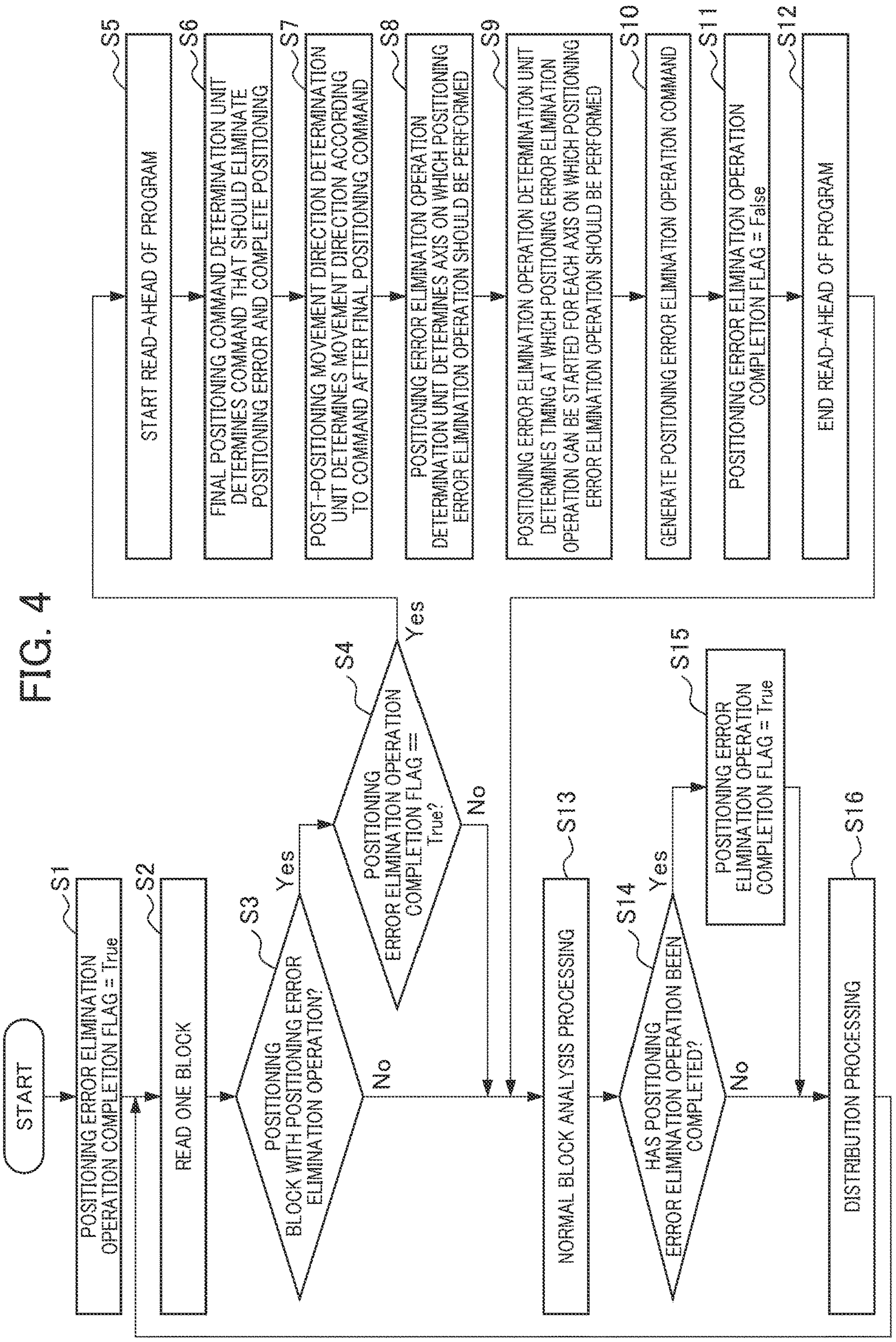
FIG. 4 is a flowchart showing a processing procedure of the numerical control device according to the embodiment of the present disclosure.

Next, a processing procedure of the numerical control device 1 according to the present embodiment will be described. FIG. 4 is a flowchart showing a processing procedure of the numerical control device 1 according to the present embodiment. The processing is repeatedly executed at a predetermined cycle when the numerical control device 1 analyzes the machining program.

In Step S1, the program analysis unit 12 sets a positioning error elimination operation completion flag to True. Then, the process proceeds to Step S2. The positioning error elimination operation completion flag is set for each axis.

In Step S2, the program analysis unit 12 reads one block from the command blocks of the machining program. Then, the process proceeds to Step S3.

In Step S3, the positioning determination unit with positioning error elimination operation 13 determines whether the one block read in Step S2 is a positioning block with a positioning error elimination operation. For example, it is determined whether the one block read in Step S2 is a single direction positioning operation command block defined by the G code (G60). When it is determined to be YES, the process proceeds to Step S4, and when it is determined to be NO, the process proceeds to Step S13.

In Step S4, the program analysis unit 12 determines whether the positioning error elimination operation completion flag is True. When it is determined to be YES, the process proceeds to Step S5, and when it is determined to be NO, the process proceeds to Step S13.

In Step S5, the program read-ahead unit 11 starts read-ahead of the machining program. Then, the process proceeds to Step S6.

In Step S6, the final positioning command determination unit 14 determines a command that should eliminate the positioning error and complete the positioning. Specifically, when the positioning blocks are continuous, the final positioning command determination unit 14 determines the final positioning command block among the continuous positioning blocks as the final positioning command that should finally eliminate the positioning error and complete the positioning. Then, the process proceeds to Step S7.

In Step S7, the post-positioning movement direction determination unit 15 determines a movement direction according to the command after the final positioning command. Specifically, the post-positioning movement direction determination unit 15 determines a movement direction in the machining operation command such as the linear interpolation operation command after the final positioning command. Then, the process proceeds to Step S8.

In Step S8, the positioning error elimination operation determination unit 16 determines an axis on which the positioning error elimination operation should be performed. Specifically, the positioning error elimination operation determination unit 16 determines, based on the final positioning command that should finally eliminate the positioning error and complete the positioning among the continuous positioning blocks, the axis on which the positioning error elimination operation should be performed, and the movement direction in the command after the final positioning command. Then, the process proceeds to Step S9.

In Step S9, the positioning error elimination operation determination unit 16 determines a timing at which the positioning error elimination operation can be started for each axis on which the positioning error elimination operation should be performed. Then, the process proceeds to Step S10.

In Step S10, the positioning error elimination operation command generation unit 17 generates a positioning error elimination operation command. Specifically, the positioning error elimination operation command is generated based on the positioning error elimination operation determined by the positioning error elimination operation determination unit 16. Then, the process proceeds to Step S11.

In Step S11, the program analysis unit 12 sets the positioning error elimination operation completion flag to False. More specifically, the positioning error elimination operation completion flag is set to False with respect to the axis determined as the axis on which the positioning error elimination operation should be performed in Step 38. Then, the process proceeds to Step S12.

In Step S12, the program read-ahead unit 11 ends the read-ahead of the machining program. Then, the process proceeds to Step S13.

In Step S13, the program analysis unit 12 executes analysis processing for a normal command block. Then, the process proceeds to Step S14.

In Step S14, the program analysis unit 12 determines whether the positioning error elimination operation has been completed. When it is determined to be YES, the process proceeds to Step S15, and when it is determined to be NO, the process proceeds to Step S16.

In Step S15, the program analysis unit 12 sets the positioning error elimination operation completion flag to True. More specifically, the positioning error elimination operation completion flag is set to True with respect to the axis for which the positioning error elimination operation is determined to have been completed in Step S14. Then, the process proceeds to Step S16.

In Step S16, the distribution processing unit 18 executes distribution processing. Specifically, the distribution processing unit 18 generates a distribution command to distribute the interpolation movement command generated from the machining program and the positioning error elimination operation command generated in Step S10 to each of the driving axes. Then, the process returns to Step S2.

According to the numerical control device 1 according to the present embodiment, the following effects are achieved.

(1) The numerical control device 1 according to the present embodiment includes: a final positioning command determination unit 14 that determines a final positioning command that should finally eliminate a positioning error and complete positioning by reading ahead the machining program when a positioning command block with a positioning error elimination operation is analyzed; a post-positioning movement direction determination unit 15 that determines a movement direction according to a command after the final positioning command; and a positioning error elimination operation determination unit 16 that determines, based on results of determination by the final positioning command determination unit 14 and the post-positioning movement direction determination unit 15, an axis on which a positioning error elimination operation should be performed, and determines an operation to eliminate a positioning error on a determined axis on which the positioning error elimination operation should be performed.

Thus, the minimum required single direction positioning can be executed, and the cycle time can be shortened compared to the conventional operation. Further, it is troublesome to create a program considering locations where the single direction positioning operations are required, but according to the numerical control device 1 according to the present embodiment, it is possible to automatically determine the axis on which the positioning error elimination operation should be performed, whereby the program is created more easily.

(2) In the numerical control device 1 according to the present embodiment, the positioning error elimination operation determination unit 16 determines a timing at which the positioning error elimination operation is started on the axis on which the positioning error elimination operation should be performed, and determines an operation to eliminate a positioning error on the axis on which the positioning error elimination operation should be performed after a determined timing. Thus, the positioning error elimination operation can be executed at the optimum timing in addition to the effect of (1) described above.

(3) In the numerical control device 1 according to the present embodiment, the positioning error elimination operation determination unit 16 determines an axis that finishes moving in an axial direction as the axis on which the positioning error elimination operation should be performed. Thus, the effects of (1) and (2) described above are achieved more reliably.

The present disclosure is not limited to the above-described embodiment, and is variously changed and modified.

In the above-described embodiment, for example, the single direction positioning operation has been described as an example of the positioning error elimination operation, but the present invention is not limited thereto. The present invention can also be applied to the positioning error elimination operation other than the single direction positioning operation.

In addition, as another embodiment in which only the configuration of the positioning error elimination operation determination unit is changed from the above-described embodiment, there may be configured not to determine the axis on which the positioning error elimination operation should be performed, but to determine a timing at which the positioning error elimination operation can be started. In this case, the positioning error elimination operation determination unit determines, based on the result of the determination by the final positioning command determination unit, the timing at which the positioning error elimination operation can be started, and determines an operation to eliminate the positioning error after a determined timing. Thus, the positioning error elimination operation can be executed at the optimum timing, and the cycle time can be shortened.

EXPLANATION OF REFERENCE NUMERALS

1 numerical control device
11 program read-ahead unit
12 program analysis unit
13 positioning determination unit with positioning error elimination operation
14 final positioning command determination unit
15 post-positioning movement direction determination unit
16 positioning error elimination operation determination unit
17 positioning error elimination operation command generation unit
18 distribution processing unit

The invention claimed is:

1. A numerical control device that machines a workpiece by driving an axis of a machine tool based on a machining program, the numerical control device comprising a processor configured to:

generate a final positioning command that finally eliminates a positioning error and complete positioning by reading ahead the machining program when a positioning command block with a positioning error elimination operation, wherein the positioning error elimination operation consists of a single direction positioning operation performed only from one direction set in advance, is analyzed;

acquire a movement direction according to a command after the final positioning command;

determine, based on the final positioning command and the movement direction, an axis on which a positioning error elimination operation is performed, and generate a positioning error elimination operation command to eliminate a positioning error by the single direction positioning operation on the determined axis on which the positioning error elimination operation is performed, and distribute the positioning error elimination operation command to each driving axis.

2. The numerical control device according to claim 1, wherein the processor is configured to determine a timing at which the positioning error elimination operation is able to be started on the axis on which the positioning error elimination operation is performed, and generate a positioning error elimination operation command to eliminate a positioning error on the axis on which the positioning error elimination operation is performed after a determined timing.

3. The numerical control device according to claim 1, wherein the processor is configured to determine an axis that finishes moving in an axial direction as the axis on which the positioning error elimination operation is performed.

4. A numerical control device that machines a workpiece by driving an axis of a machine tool based on a machining program, the numerical control device comprising a processor configured to:

generate a final positioning command that finally eliminates a positioning error and complete positioning by reading ahead the machining program when a positioning command block with a positioning error elimination operation, wherein the positioning error elimination operation consists of a single direction positioning operation performed only from one direction set in advance, is analyzed;

determine, based on the final positioning command, a timing at which a positioning error elimination operation is able to be started, and generate a positioning error elimination operation command to eliminate a positioning error by the single direction positioning operation after a determined timing; and distribute the positioning error elimination operation command to each driving axis.

5. The numerical control device according to claim 2, wherein the processor is configured to determine an axis that finishes moving in an axial direction as the axis on which the positioning error elimination operation is performed.

* * * * *